United States Patent
Krishnamurthi et al.

(10) Patent No.: US 7,656,840 B2
(45) Date of Patent: Feb. 2, 2010

(54) METHOD OF REDUCING DENIAL-OF-SERVICE ATTACKS AND A SYSTEM AS WELL AS AN ACCESS ROUTER THEREFOR

(75) Inventors: Givindarajan Krishnamurthi, Arlington, MA (US); Robert Chalmers, Goleta, CA (US)

(73) Assignee: Nokia Corporation, Espoo (FI)

( * ) Notice: Subject to any disclaimer, the term of this patent is extended or adjusted under 35 U.S.C. 154(b) by 695 days.

(21) Appl. No.: 10/785,407

(22) Filed: Feb. 25, 2004

(65) Prior Publication Data
US 2004/0165551 A1 Aug. 26, 2004

Related U.S. Application Data

(60) Provisional application No. 60/450,444, filed on Feb. 26, 2003.

(51) Int. Cl.
H04W 4/00 (2009.01)
H04W 36/00 (2009.01)
(52) U.S. Cl. .................................... 370/331; 455/436
(58) Field of Classification Search ............... 370/331, 370/316, 389, 401, 338; 455/436
See application file for complete search history.

(56) References Cited

U.S. PATENT DOCUMENTS

| 6,137,791 | A * | 10/2000 | Frid et al. ................ 370/352 |
| 6,370,380 | B1 * | 4/2002 | Norefors et al. ........... 455/436 |
| 6,418,130 | B1 * | 7/2002 | Cheng et al. ............... 370/331 |
| 6,553,231 | B1 * | 4/2003 | Karlsson et al. ............ 455/436 |
| 7,050,793 | B1 * | 5/2006 | Kenward et al. .......... 455/414.4 |
| 7,130,286 | B2 * | 10/2006 | Koodli et al. ............... 370/331 |
| 2006/0274693 | A1 * | 12/2006 | Nikander et al. ........... 370/331 |

OTHER PUBLICATIONS

Candidate Access Router Discovery; Hemant Chaskar; Mar. 2003; IETF Seamoby Working Group; pp. 3,5 and 6.*
P. S. Henry and H. Luo, "WiFi: What's next," *IEEE Communications Magazine*, vol. 40, No. 12, pp. 66-72, Dec. 2002.
K. El Malki (Editor), "Low latency handoffs in Mobile IPv4," Tech. Rep. draft-ietf-mobileip-lowlatency-handoffs-v4- *.txt, Internet Engineering Task Force (IETF), Jun. 2002.
R. Koodli (Editor), "Fast handovers for Mobile IPv6," Tech. Rep. draft-ietf-mobileip-fast-mipv6- *.txt, Internet Engineering Task Force (IETF), Sep. 2002.

(Continued)

*Primary Examiner*—George Eng
*Assistant Examiner*—Michael Faragalla
(74) *Attorney, Agent, or Firm*—Mintz, Levin, Cohn, Ferris, Glovsky and Popeo, P.C.

(57) ABSTRACT

A method and system reduces denial-of-service attacks malicious mobile nodes in a mobile IP environment. The method and system includes maintaining, by each of a plurality of access routers within the mobile IP environment, a cache of neighboring access routers as candidates and their associated access points. The caches are populated in response to actions initiated by mobile nodes. Each cache entry is tagged with the identity of the action initiating mobile node. The identity is based on information that is verifiable by the access routers and which cannot be modified arbitrarily by the mobile node. The total number of entries that can be tagged and thus introduced into a cache by any given node is limited.

17 Claims, 4 Drawing Sheets

OTHER PUBLICATIONS

J. Kempf (Editor), "Problem description: Reasons for performing context transfers between nodes in an IP access network," Request for Comments (Informational) 3374, Internet Engineering Task Force (IETF), Sep. 2002.

G. Krishnamurthi (Editor), "Requirements for CAR discovery protocols," Tech. Rep. draft-ietf-seamoby-card-requirements- *.txt, Internet Engineering Task Force (IETF), Aug. 2002.

R. Koodli and C. Perkins, "Fast handovers and context transfers in mobile networks," *ACM Computer Communication Review*, vol. 31, No. 5, pp. 33-47, Oct. 2001.

P. Bhagwat, C. Perkins and S. Tripathi, "Network layer mobility: An architecture and survey," *IEEE Personal Communications*, vol. 3, No. 3, pp. 54-64, Jun. 1996.

C. Perkins (Editor), "IP Mobility support in IPv4," Request For Comments 3344, Internet Engineering Task Force (IETF), Aug. 2002.

D. Johnson, C. Perkins and J. Arkko, "Mobility support in IPv6," Tech. Rep. draft-ietf-mobileip-ipv6-*.txt, Internet Engineering Task Force (IETF), Jan. 2003.

C. Perkins and D. Johnson, "Mobility support in IPv6," in *Proceedings of Mobicom'96*, Rye, NY, USA, Nov. 1996.

T. Pagtzis and P. Kirstein, "Proactive mobility for future IP wireless access networks," in *Proceedings of 6th IASTED/IEEE International Conference on Wireless and Optical Communications (WOC'02)*, Banff, Canada, Jul. 2002.

R. Stewart, Q. Xie, K. Morneault, C. Sharp, H. Schwarzbauer, T. Taylor, I. Rytina, M. Kalla, L. Zhang and V. Paxson, "Stream control transmission protocol," RFC 2960, Internet Engineering Task Force, Oct. 2000.

D. Trossen, G. Krishnamurthi, H. Chaskar, R. Chalmers and E. Shim, "A dynamic protocol for candidate access-router discovery," Tech. Rep. draft-trossen-seamoby-dycard-00*.txt, Internet Engineering Task Force (IETF), Oct. 2002.

E. Shim, J. P. Redlich and R. Gitlin, "Secure candidate access router discovery," in *Proceedings of IEEE Wireless Communications and Networking Conference (WCNC'3)*, New Orleans, LA, USA, Mar. 2003.

H. Syed, G. Kenward, P. Calhoun, M. Nakhjiri, R. Koodli, K. Atwal, M. Smith and G. Krishnamurthi, "General requirements for context transfer," Tech. Rep. draft-ietf-seamoby-ct-reqs-*.txt, Internet Engineering Task Force (IETF), Jul. 2002.

CARD Design Team, "Candidate Access Router Discovery", Tech. Rep. draft-ietf-seamoby-card-protocol-*.txt, Internet Engineering Task Force (IETF), Mar. 2003.

C.E. Perkins, P. Calhoun, "Mobile IPv4 Challenge/Response Extensions", IETF RFC 3012, Nov. 2000.

E. Shim, J.P. Redlich, R. Gitlin, "Secure Candidate Access-Router Discovery", Proceedings of IEEE Wireless Communications and Networking Conference, New Orleans, Mar. 2003.

* cited by examiner

US 7,656,840 B2

METHOD OF REDUCING DENIAL-OF-SERVICE ATTACKS AND A SYSTEM AS WELL AS AN ACCESS ROUTER THEREFOR

CROSS-REFERENCE TO RELATED APPLICATIONS

This application claims priority under 35 U.S.C. § 119(e) from U.S. Provisional Patent Application Ser. No. 60/450,444, filed on Feb. 26, 2003. The contents of this provisional application are hereby incorporated by reference.

FIELD OF THE INVENTION

The present invention relates to a method of reducing denial-of-service attacks. The present invention also relates to a system and access router therefor. Moreover, the present invention relates to a method, system and access router of validating information of a mobile node within a candidate access router discovery procedure in a mobile IP environment.

BACKGROUND OF THE INVENTION

Telecommunication networks for mobile devices include cellular communication systems; mobile Internet Protocol (IP) networks; paging systems; and others. Cellular systems generally allow mobile terminals to move geographically by "handing off" localized communication links among access points or base stations. Similarly, mobile IP networks allow IP-enabled devices such as wireless Personal Digital Assistants (PDAs) and mobile computers to move about geographically dispersed areas while maintaining a connection to the Internet.

FIG. 1 shows a conventional mobile IP network that covers three service areas SA1, SA2, and SA3. For the sake of simplicity, only IP services are shown, although as explained above, separate transmission networks can be provided for voice services. As shown in FIG. 1, a mobile terminal MT is within service area SA1 served by base station BS1 (also called an access point or AP). Base station BS1 is connected to an access router AR1 which, in turn, connects to an Internet service provider ISP1 that provides access to the Internet. Other base stations such as BS3 may also be connected to access router AR1 such that a common IP address is used for mobile terminals even though the terminals may pass through different service areas. In other words, although there may be a hand off of radio frequency channels when the mobile terminal moves between service area SA1 and service area SA3, it may not be necessary to change the IP address used to communicate with the mobile terminal because the Internet connection is still served by the same access router AR1.

A second service area SA2 is served by a separate base station BS2, which is in turn connected to a different access router AR2. Due to the network topology, access routers AR1 and AR2 use different blocks of IP addresses for communicating with mobile terminals roaming within their associated service areas. If mobile terminal MT moves from service area SA1 to service area SA2, some mechanism is needed to hand off the Internet connection from access router AR1 to access router AR2. Similarly, if service areas SA1 and SA2 are separated by a large logical distance (e.g., AR1 and AR2 are connected to different ISPs), some coordination mechanism is needed to permit data transmitted to a terminal previously operating in service area SA1 to be forwarded to service area SA2 if that terminal moves into area SA2.

One conventional scheme for handing off IP connections is depicted in FIG. 2. Service area SA1 is served by access router AR1, which is designated the "home agent" for communicating with a particular mobile terminal MT. While mobile terminal MT moves within service area SA1, access router AR1 communicates with the mobile terminal using a care-of address. IP packets (e.g., e-mail, Web pages, and the like) are transmitted over the Internet to ISP1, which forwards the traffic to AR1, which in turn forwards the packets to the mobile terminal in its service area. If mobile terminal MT moves to a different service area SA2 served by a different access router AR2, packets that were previously transmitted to AR1 will no longer reach the mobile terminal. One conventional solution is to advertise (e.g., broadcast) the existence of access router AR2 in service area SA2 such that when mobile terminal MT moves into service area SA2, it is notified of the existence of access router AR2, and it receives a new IP address for communicating within service area SA2. Mobile terminal MT or access router AR2 then sends a binding update to home agent AR1 (e.g., through a land line LL or over the Internet), so that home agent AR1 knows the IP address that will allow packets to reach the mobile terminal in service area SA2. The home agent treats this address as a "care-of" address, and all further packets to the original IP address are forwarded to the new IP address. In essence, two separate IP addresses are used to communicate with the mobile terminal: a home agent address and a care-of address that changes at each new point of attachment. This scheme is described in the Internet Engineering Task Force (IETF) Request for Comments (RFC) number 2002 (October 1996)

Advantageously the target access router (AR2) is known by the originating access router (AR1) prior to the handoff (e.g., mobile terminal MT has accepted the advertisement from AR2 and is assigned an IP address for communicating with it). If there are multiple access routers in the target area each with overlapping service areas, there is no easy way for the mobile terminal to select from among them. For example, suppose that a mobile terminal is receiving high bandwidth video data while moving out of a service area. Two other overlapping service areas served by two access routers controlled by two different service providers may be available to accept the handoff of the mobile terminal's IP connection. One of the two access routers may provide high-speed access to the Internet, while the second one may not. There is no way for the mobile terminal to specify or select intelligently from among the two access routers.

Another problem concerns handoff speed. The conventional scenario shown in FIG. 2 may not be able to provide fast handoff speed because of the handshaking required between the mobile terminal and the new access router AR2. Packets may be lost if handoff of the IP connection is not performed smoothly. Moreover, if an IP connection is used for voice-quality signals or music, latency introduced by the handoff may unacceptably disrupt the connection.

Another difficulty with handing off IP connections in mobile networks arises where heterogeneous networks (using different access technologies) served by potentially different (and incompatible) service providers are concerned. Referring again to FIG. 1, if service area SA1 is served by a first Operator while service area SA2 is served by another Operator, then the two service providers must agree on a coordination mechanism to accept handoffs of IP services from each other's system. The problem of providing seamless handovers in IP environments is related to ongoing efforts in the Internet Engineering Task Force (IETF), namely in Seamless Mobility (SeaMoby) and Mobile IP working groups. Context transfer and fast handover protocols have been developed to exchange session-related information or proactively establish mobile IP connectivity, respectively. Both protocols assume that the target access router is known when requesting the desired functionality (see FIG. 1). Although the discovery of the handoff candidate is included in the SeaMoby working group charter, discovery protocols for physically adjacent access routers have not been specified so far. To address at least some of the aforementioned problems a number of proposals for a Candidate access Router Discovery (CARD) protocol are being developed. Advantageously, the CARD protocol is designed to dynamically collect information about neighboring access routers and the capabilities of those routers. By dynamically collecting information about neighboring routers and their capabilities, mobile terminals can dynamically execute a handoff with low latency, and can more intelligently select a target access router. More particularly, in many current proposals for the CARD protocol, access routers maintain a cache of neighboring access routers and associated base stations (i.e., access points). Two access routers are considered neighbors, then, only if the access routers have associated base stations with overlapping coverage areas. The caches are typically populated directly or indirectly in response to actions initiated by mobile terminals.

The CARD protocol is generally susceptible to "denial-of-service" (DoS) attacks by colluding malicious mobile terminals, which cause the erroneous storage of information in the caches of the access routers. And although the protocol requires mobile terminals to be authenticated prior to functioning with access routers according to the CARD protocol, the possibility remains for the mobile terminals to act maliciously by polluting the cache or one or more access routers. Erroneous cache entries can be problematic for access routers and the network in general in a number of different ways.

If the size of an access router's cache is limited, invalid cache entries can eventually replace valid entries. Then, as the number of valid entries is reduced, the effectiveness of the protocol is likewise diminished since necessary mappings between actual neighboring access routers and their base stations will be missing. Such a situation can directly affect the number of mobile terminals that can benefit from the seamless handovers aided by the CARD protocol. Also, if the size of the cache is unlimited, invalid entries can exhaust the memory resources of the access router. Further, in addition to storing the base stations associated with an access router, the cache can also store recent IP capabilities of the neighboring router. These capabilities can be dynamic, requiring frequent updates between the two access routers. A high number of invalid entries though can increase the memory, processing and network load of both access routers, thereby affecting the capacity of each access router to perform other services.

Therefore, what is needed is a system and method for addressing DoS attacks by mobile terminals in the candidate access router discovery.

SUMMARY OF THE INVENTION

Accordingly, the present invention is a method of reducing denial-of-service attacks by malicious mobile nodes in a mobile IP environment, comprising: maintaining, by each of a plurality of access routers within the mobile IP environment, a cache of neighboring access routers as candidates and their associated access points; and populating the caches in response to actions initiated by mobile nodes, wherein each cache entry is tagged with the identity of the action initiating mobile node, which identity is based on information that is verifiable by the access routers and which cannot be modified arbitrarily by the mobile node, and the total number of entries that can be tagged and thus introduced into a cache by any given node is limited.

The present invention is also a method of validating information of a mobile node within a candidate access router discovery procedure in a mobile IP environment, comprising: generating a token by a first access router to which the mobile node was previously attached to; sending the token from the first access router to the mobile node within a message comprising a list of candidate access routers; sending the token from the mobile node to a second access router as selected candidate after a handover procedure between the access routers; sending the token within an exchange between the access routers specific to the discovery procedure from the second access router back to the first access router for verification.

As a preferred modification to either of the above methods, the identity of the mobile node may be the international mobile subscriber identity (IMSI) for cellular communication systems, and the network access identifier (NAI) for systems based on the Internet Protocol (IP).

A further modification to the former method may be that an action initiated by a mobile node is a handover procedure of the mobile node between a previous access router and a new access router, wherein the method further comprises generating a token by the previous first access router; sending the token from the previous access router to the mobile node within a message comprising a list of candidate access routers; sending the token from the mobile node to the new access router as selected candidate after the handover procedure; sending the token within a neighbor exchange between the access routers resulting in cache entries being created or refreshed from the second access router back to the first access router for verification.

This modification may be further varied in that the token is generated by maintaining by the previous access router a short list of random values used as keys to hash the identity of the mobile node, each key in the list is associated with an integer index that is passed along with the token, and upon receiving the token for verification, the previous access router uses the index to lookup the associated key, hash the identity of the mobile node sent in the neighbor exchange and compares the hash to the token.

In this case, with progressing time new keys are generated and added to the head of the list while old keys are expired and removed so that from the length of the list and the frequency of generated keys, the total amount of time is determined a mobile has been attached. That is, it is utilized that the length of the list limits the total time allowed a mobile node can be unattached. In other words, the length of the list bounds the time allowed for the handover, before it is considered disjoint.

Further, the present invention is a system for reducing denial-of-service attacks by malicious mobile nodes in a mobile IP environment, comprising: a plurality of access routers within the mobile IP, each maintaining a cache of neighboring access routers as candidates and their associated access points; and a plurality of mobile nodes which are capable of populating the caches in response to actions initiated, wherein the cache is arranged such that each cache entry is tagged with the identity of the action initiating mobile node having thus created the entry, and that the total number of entries that can be tagged and thus introduced into the cache by any given node is limited.

The present invention is also a system for validating information of a mobile node within a candidate access router discovery procedure in a mobile IP, comprising a first access router, said mobile node and a second access router, wherein:

the first access router includes generating means for generating a token, first sending means for sending the token to the mobile node within a message comprising a list of candidate access routers, the mobile node includes second sending means for sending the token to the second access router as selected candidate after a handover procedure between the access routers, the second access router includes third sending means for sending the token within an exchange between the access routers specific to the discovery procedure back to the first access router and verification means for verifying the token.

The former system may be modified in that the access routers include generating means for generating a token, first sending means for sending the token to a mobile node within a message comprising a list of candidate access routers, second sending means for sending the token within a neighbor exchange between access routers resulting in cache entries being created or refreshed, and verification means for verifying the token; and the mobile nodes include third sending means for sending the token to a new access router as selected candidate after a handover procedure.

In this case, the generating means may include first hashing means for hashing the identity of the mobile node by using random values out of a short list as keys, associating means for associating each key in the list with an integer index, and the verification means may include a lookup table for the indices and their associated keys, second hashing means for hashing the identity of the mobile node and comparing means for comparing the hash to the token.

Also in this case, the generating means may be adapted to generate new keys with progressing time, to add them to the head of the list, and to remove old keys; while the system may further comprise determination means for determining the total amount of time a mobile has been attached from the length of the list and the frequency of generated keys.

Moreover, the present invention is an access router for reducing denial-of-service attacks by malicious mobile nodes in a mobile IP, comprising: a cache of neighboring access routers as candidates and their associated access points, wherein the cache is arranged such that each cache entry is tagged with the identity of the mobile node having initiated the entry creation, and that the total number of entries that can be tagged and thus introduced into the cache by any given node is limited.

Still further, the present invention is an access router for validating information of a mobile node in a mobile IP, comprising generating means for generating a token; first sending means for sending the token to the mobile node within a message comprising a list of candidate access routers; second sending means for sending the token within an exchange with another access router specific to the discovery procedure to the other access router; and verification means for verifying the token.

The former access router may further comprise generating means for generating a token, first sending means for sending the token to a mobile node within a message comprising a list of candidate access routers, second sending means for sending the token within a neighbor exchange with another access router resulting in cache entries being created or refreshed, and verification means for verifying the token.

In this case, the generating means may include first hashing means for hashing the identity of the mobile node by using random values out of a short list as keys, associating means for associating each key in the list with an integer index, and the verification means may include a lookup table for the indices and their associated keys, second hashing means for hashing the identity of the mobile node and comparing means for comparing the hash to the token.

In addition, the generating means can be adapted to generate new keys with progressing time, to add them to the head of the list, and to remove old keys.

BRIEF DESCRIPTION OF THE DRAWINGS

Figure 1:
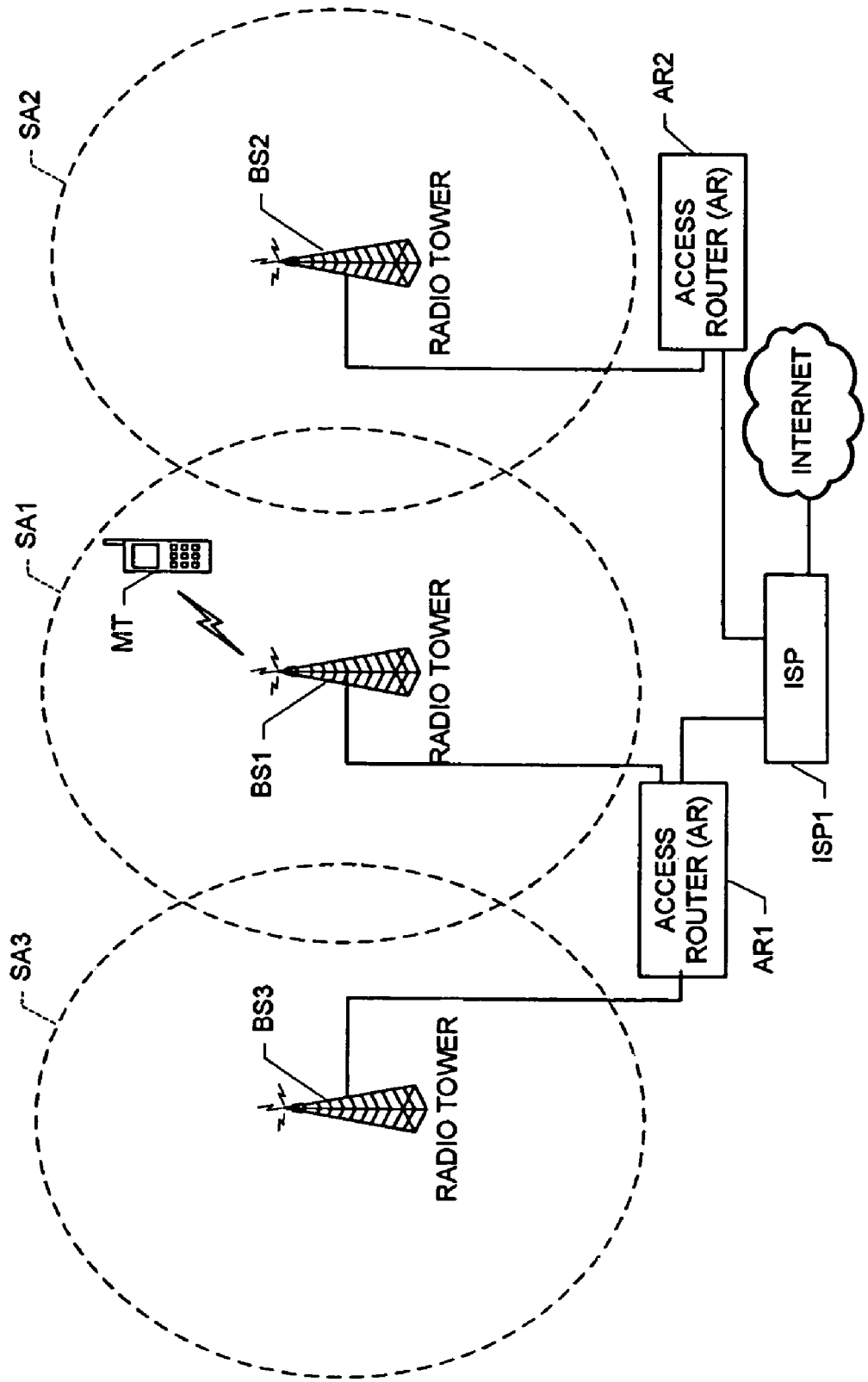
Figure 2:
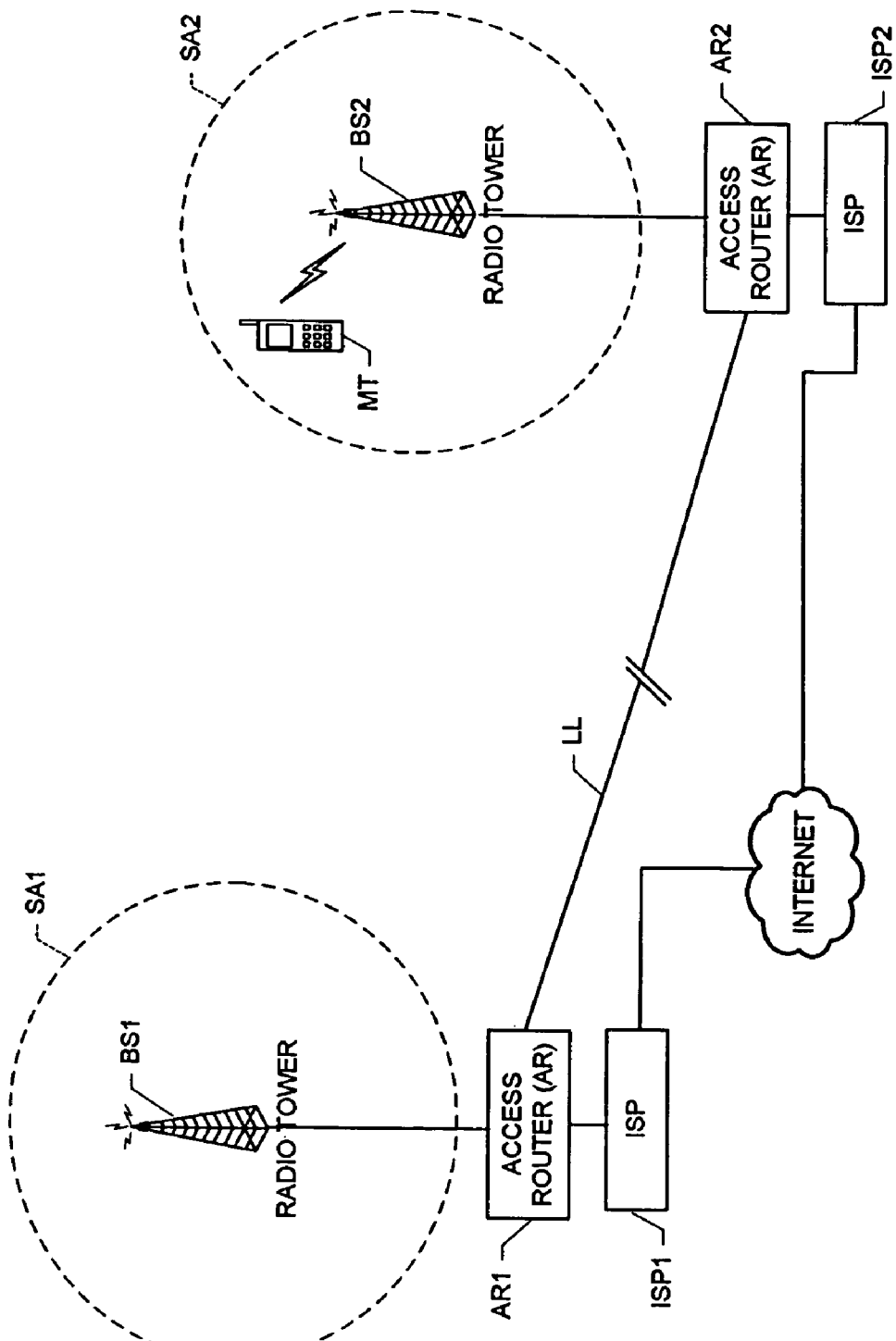
Figure 3:
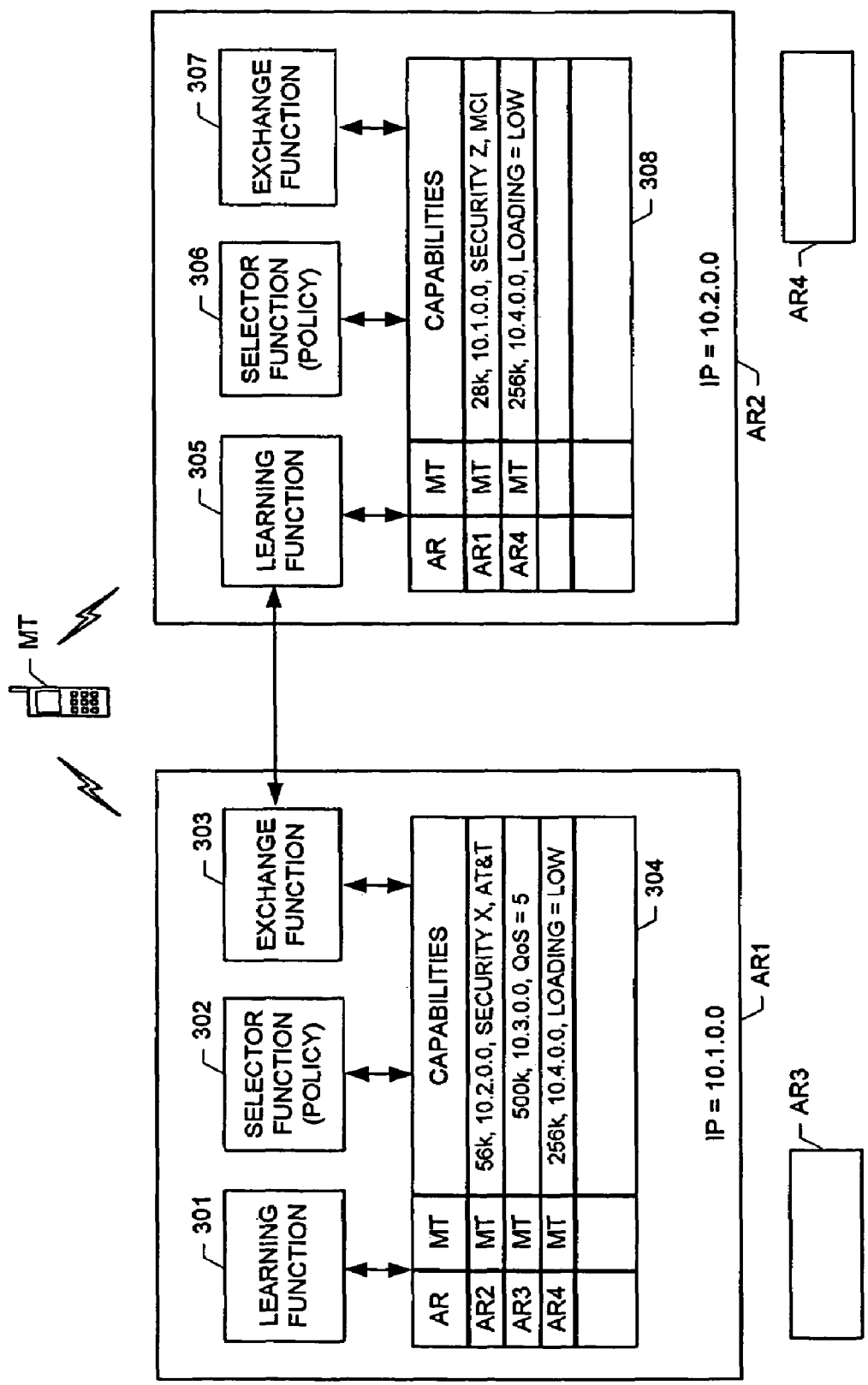
Figure 4:
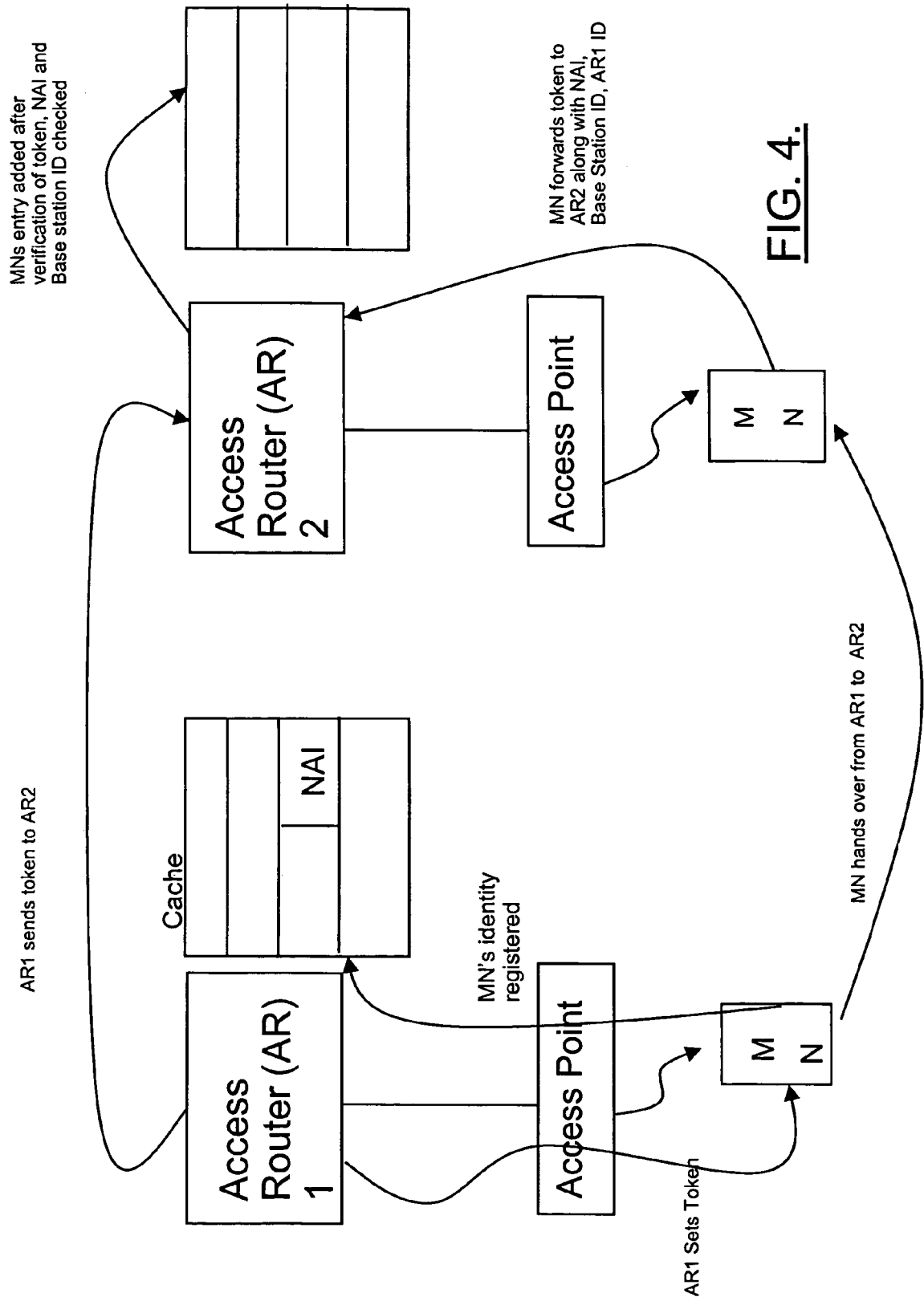

Having thus described the invention in general terms, reference will now be made to the accompanying drawings, by means of which further details, advantages and preferred embodiments of the present invention will be described, and which are not necessarily drawn to scale, and wherein:

FIG. 1 shows a conventional mobile IP network covering three service areas SA1, SA2, and SA3;

FIG. 2 shows a conventional scheme for handing off IP connections in which a mobile terminal registers with a home agent AR1 but also communicates using a second IP address through a "care-of" agent AR2;

FIG. 3 shows a system according to the present invention including a plurality of access routers AR1 and AR2, each of which includes a capability map describing capabilities of geographically proximate access routers; and FIG. 4 shows a system and method according to the present invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The following will describe systems and methods for reducing denial-of-service (DoS) attacks while implementing a Candidate access Router Discovery (CARD) protocol. Whereas the systems and methods will be described in conjunction with one proposed CARD protocol, it should be understood that the systems and methods can be implemented in any of a number of other CARD protocols, proposed or otherwise, without departing from the spirit and scope of the present invention. For more information on the CARD protocol described herein, see PCT Patent Application with International publication No. WO 03/003639, entitled: Protocol to Determine Optimal Target Access Routers for Seamless IP-Level Handover, filed Jun. 25, 2002, the contents of which are hereby incorporated by reference in its entirety.

With reference to FIG. 3, in a system employing various principles of the invention, a first access router AR1 serves a first service area (not shown) in which a mobile terminal MT may be located. Although not explicitly shown in FIG. 3, it is assumed that each access router transmits and receives data packets through one or more base stations (i.e., access points) that cover corresponding geographic areas. It is also assumed that each access router provides Internet-compatible connections (e.g., Internet Protocol compatibility) such that data packets received at each router can be forwarded to one or more mobile terminals within the corresponding service area. Each access router includes an IP address used for communicating directly with the access router and a block of IP addresses that can be allocated and used by the access router for communicating with mobile terminals served by the access router. For purposes of illustration, AR1 is shown as having an IP address of 10.1.0.0, and AR2 is shown as having an IP address of 10.2.0.0.

According to one aspect of the invention, each access router creates and maintains a local cache that includes a capability map 304, 308 that stores information concerning other access routers that are geographically adjacent. According to one aspect of the invention, as a mobile terminal MT moves into the area serviced by an access router, the mobile terminal transmits the IP address of the access router for the service area from which the mobile terminal is leaving. In other words, each mobile terminal passes to the next access router information concerning the previously used access router (the previous router's identity, i.e., its IP address). An inference can be drawn that, by virtue of moving out of one router's service area and into another router's service area, the two routers are geographically adjacent. Once each access router knows about the other one, they can exchange capability information that can be used to select a target access router for future handoffs. The capability information, along with the physical neighborhood AR map, can also be constructed through manual configuration.

As shown in FIG. 3, access router AR1 includes a learning function 301, a selector function 302, and an exchange function 303. Similarly, access router AR2 contains such functions 305, 306, and 307, respectively, in addition to the capabilities map 308. Other access routers AR3 and AR4 are shown without internal details. In general, each learning function receives information from mobile terminals that move into the service area associated with an access router (e.g., the IP address of the previously used access router).

The exchange functions 303 and 305 exchange capability information between two access routers in response to the learning function. For example, when mobile terminal MT is about to move out of the service area supported by AR1 and into the service area of AR2, the mobile terminal transmits to AR2 the IP address (in this case, 10.1.0.0) of the originating access router AR1. In response, learning function 307 stores the IP address of AR1 into capability map 308, and causes exchange function 305 to transmit a request to AR1 to exchange capability information. Thereafter, the exchange functions of the respective access routers exchange capability information (described in more detail below) concerning each respective router's capabilities.

Selector functions 302 and 306 select target access routers for mobile terminals based on capability information stored in capability maps 304 and 308, respectively. For example, if mobile terminal MT is about to move from a service area served by AR1 into a service area served by multiple target access routers (including, for example, AR2 and AR4), selector function 302 in AR1 consults capability map 304 to determine which access router best suits the capabilities needed by mobile terminal MT. A movement detection scheme is used to inform AR1 which ARs are reachable by the mobile terminal upon movement of the mobile terminal.

Capabilities associated with each access router may include static capabilities (e.g., bandwidths supported by the router; security protocols; service providers; etc.) and dynamic capabilities (e.g., current loading level or network delays). Examples shown in FIG. 3 include bandwidths supported; security schemes; ISP connected to the router; IP address of the router; quality of service parameters; and dynamic loading conditions.

Any or all of the functions depicted in FIG. 3 can be implemented using computer software executing on a general-purpose or special-purpose digital computer. The capabilities information can be stored in a computer memory, relational database, or other data structure. Conventional access routers can be modified to incorporate the functions illustrated in FIG. 3.

To prevent or reduce "denial-of-service" attacks, it is considered that the access router typically authenticates the mobile terminal and ensures that it is authorized to participate in the candidate access router discovery process. This is generally handled as part of authorizing the mobile terminal to access the visited network, and thus typically occurs prior to any CARD messages being exchanged between the access router and mobile terminal. Second, in order for two access routers to participate in a capability exchange, there is typically some means by which they can mutually authenticate one another with explicit authorization to participate in the candidate access router discovery. For two routers residing in the same domain, this could be achieved with a shared key configured by an administrator. For the inter-domain case, however, the two domains in which the neighboring access routers reside must typically have a preexisting relationship, such as a roaming agreement, that can be leveraged to achieve authentication and authorization, possibly through an Authentication, Authorization and Accounting (AAA) infrastructure. Finally, all protocol packets exchanged between participants are typically secured to ensure message authenticity and integrity, and to provide replay protection. This can be achieved by employing Internet Protocol Security (IPSec) or Transport Layer Security (TLS) over Stream Control Transmission Protocol (SCTP).

Although mobile terminals may be authenticated and authorized to send messages, the present invention attempts to limit the effect of mistaken or malicious reports. The key problem is that an access router creates state in its cache in to response the information provided in messages from the mobile terminal. In most cases, invalid entries in the cache are not problematic for other mobile terminals since each mobile includes which base stations it considers currently reachable. Only matching entries are returned. However, with enough bogus entries, a mobile terminal could overrun the router's memory unless the size of the cache is strictly limited. Once the total size of the cache is restricted, the risk exists that valid entries will be replaced with erroneous ones, thus directly affecting the support of non-malicious mobile terminals.

For a single malicious terminal acting alone, an erroneous message can take on a combination of three basic forms, the mobile terminal lies about 1) its current base station, 2) its previous base station, or 3) its previous access router. In the first case, the mobile terminal can provide an invalid base station ID for its current access point. In the second case, the previous access router and base station are associated, but are not neighbors of the current access router. In the last case, the previous base station is not associated with the reported previous access router, but is actually a neighboring base station. To catch these errors, the access routers perform the following three validity checks for each message: 1) the current access router checks the current base station against a list of authorized base stations; 2) the previous access router checks that the previous base station exists as a local entry in its cache; and 3) the previous access router verifies that the mobile terminal was recently present.

An access router can discover the presence of its own local base stations similarly to the presence of neighboring base stations, namely via messages to the new access router. However, to ensure that a reported base station is actually local, the access router must maintain a list of those base stations that are authorized to be local. In the strictest sense, this could be an absolute list of attached base stations. On the other hand, the administrator could maintain a list that is less strict, representing the superset of base stations that could be attached over some period of time. This better supports reconfigurability since base stations can be added, removed or even moved between access routers without requiring immediate changes to the list.

In order to verify that the mobile terminal was recently present, the previous router seemingly must maintain some short-lived state for each attached mobile terminal. For mobile terminals operating in the stateful mode (discussed below), this state is available. To support a large number of mobile terminals running in stateless mode (also discussed below), however, a more scalable solution is provided.

The first step in verifying the presence of a mobile terminal is to be able to properly identify it. The mobile terminal can be identified in any of a number of different manners. In one embodiment, for example, the access router identifies the mobile terminal via the same credentials originally provided by the mobile terminal while authenticating with the access router. In cellular systems, this might be the International Mobile Subscriber Identifier (IMSI) from the mobile terminal's subscriber identity module (SIM) card. For Authentication, Authorization and Accounting (AAA)-based authentication, the user's Network Access Identifier (NAI) can be used. In either case, this identifier will typically have been validated by the access router as part of the process of authentication, and thus provides a certain level of accountability against malicious activities.

Rather than track the identity of each attached mobile terminal for some period of time, the access router can generate a token that it appends to each message it sends to a mobile terminal during target access router selection. The mobile terminal can then submit this token with its message to the new access router (e.g., Router Identity message as described below), and the token is passed back to the previous access router for verification along with the mobile terminal's identification as part of a physical neighbor exchange (e.g., PNE message as described below). To generate a token, the access router maintains a small list of random numbers used as keys to hash the identity of the mobile terminal. Each random number is associated with an index that is passed along with the token. Upon receiving a token for verification, the access router can use the index to lookup the associated key, hash the mobile terminal identity passed to the access router, and thereafter compare the hash to the token. As time progresses, new keys can be generated and added to the head of the list while old keys are expired and removed. The length of the list and the frequency of generated keys are configurable and determine the total amount of time a mobile terminal is considered as having been recently attached. That is, it is utilized that the length of the list limits the total time allowed a mobile node can be unattached. In other words, the length of the list bounds the time allowed for the handover, before it is considered disjoint.

In the case of multiple colluding mobile terminals, it is possible for one mobile terminal to share its credentials with a number of conspirators. In this case, the token-based scheme fails to adequately protect the access routers. A mobile terminal currently attached to a given access router could distribute the token to the other colluding mobiles. These nodes could then use the token to falsely claim that they had just handed-over from the first mobile terminal's access router. All validity checks would pass, and the original access router would inadvertently create entries for each of the falsified reports. To combat this, embodiments of the present invention provide a mechanism to reduce the impact that any one mobile can have on an access router's cache. According to one advantageous embodiment, each cache entry is tagged with the identity of the source mobile terminal, as shown in FIG. 3 with capability maps 304 and 306. The access router can then limit the total number of cache entries attributed to any one mobile terminal. In the example given above, the original access router would reject all but the first few attempts to create erroneous cache entries.

So far, the mechanisms presented make it difficult, yet not impossible, to inject erroneous cache entries. As discussed earlier, the key problem posed by these entries is that they may eventually force valid entries to be replaced. Therefore, a smart cache replacement policy can be employed to ensure that valid entries are given highest priority. In this regard, two simple rules can be imposed to reflect this goal: 1) favor entries that have been recently referenced; and 2) favor entries created from local Router Identity messages over those created in response to remote PNE messages (both Router Identity messages and PNE messages being described below).

Both of these rules favor information gathered from locally connected mobile terminals. This inherently diminishes the effect of a distributed attack.

In the end, any concerted attack would require a very large number of local mobile terminals impersonating an equally large number of mobile terminals spread across the network, and due to the nature of soft-state, the effort would need to be sustained in order to deny valid mobile terminals service. The final impediment, then, is accountability. Since, the colluding mobiles must share credentials that can be traced; detection of malicious behavior should ultimately result in the credentials being invalidated.

In another advantageous embodiment of the present invention, the mobile terminal and access routers exchange information regarding the base station in the service area into which the mobile terminal is moving, as well as the base station in the service area the mobile terminal is leaving. More particularly, according to this embodiment, a mobile terminal handing-over from base station BS1 to base station BS2 is considered. It is also considered that each base station is supported by an access router, AR1 and AR2, respectively. Upon handover to BS2, the mobile terminal configures a new "care-of" address (as described in the background) and performs any necessary authorization procedures with AR2. Then, the mobile terminal sends a Router Identity (RI) message to the new access router, AR2. The RI message contains information describing both the source and destination of the previous handover. Specifically, the message carries: the IP address of the previous access router, AR1; as well as the ID (e.g., basic service set identifier or BSSID) of the new base station, BS2; and the ID of the previous base station, BS1. In the case of a disjoint handover (i.e., when a mobile terminal detaches from a current base station and, at some subsequent time, attaches to a new base station), the information pertaining to the previous base station is omitted.

Upon receiving a Router Identity message, the access router, which stores a list of locally connected base stations in its cache, can advantageously update the list of its own locally connected base stations using the BS2 value passed in the message. In this regard, traditional methods do not provide a means by which an access router can detect attached base stations. Of course, this information can be statically configured by an administrator, but this does not account for possible failures and limits reconfiguration. However, according to advantageous embodiments, the access router maintains a list of local APs as soft-state that can be refreshed with each newly received RI message.

If the RI message contains the address of the previous access router, AR1, (the handover is not disjoint) the new base station can send a Physical Neighbor Exchange (PNE) message to AR1 containing the ID's of the two base stations and an identifier associated with the mobile terminal, which is discussed in more detail below. Upon receipt of the PNE message, AR1 can create or update an entry for the tuple, AR2/BS2, in its cache. AR1 can also perform a number of checks to ensure the validity of the information provided by the mobile terminal, as described below, and thereafter return a new PNE message to AR2 with the result. If the information is valid, AR2 can then update its own cache with entries for AR1 and BS 1.

As indicated, each mobile terminal handover results in bi-directional entries in the neighboring router's caches. Subsequent handovers between the two base stations can therefore refresh the cache mappings. After a time, if no handover occurs between the two routers, the cache entries can timeout and be removed. By employing soft-state, the protocol can gracefully handle failures in neighboring access routers or their base stations. Moreover, changes in the topology, such as new or relocated base stations can be discovered dynamically as soon as a mobile terminal transitions to or from the affected base station.

Embodiments of the present invention reduce denial-of-service attacks to thereby mitigate the impact of malicious mobile terminals providing false information regarding handovers. The term "mobile terminal" should be understood to include IP-enabled cellular telephones; wirelessly accessible Personal Digital Assistants (PDAs); notebook computers that can communicate wirelessly; and other mobile devices that can communicate using packetized digital communications over various transmission technologies (including CDMA, GSM, TDMA, and others) or media (radio, infrared, laser, and the like).

The term "access router" should be understood to include computer-implemented devices that route packets, such as IP packets, to addresses in a network based on routing information. However, it should be understood that access routers are distinct from base stations/access points, which may rely on different transmission schemes to transmit information (e.g., GSM or CDMA). One or more base stations could be associated with a single access router, as shown in FIG. 1. Alternatively, more than one access router could be associated with a single base station.

The term "mobile IP network" should be understood to include a network or networks (even if incompatible in transmission technology or operated by different carriers) that communicate wirelessly with mobile terminals using Internet Protocol.

Referring now to FIG. 4, a system and method according to the present invention is described in general. Depicted is a first Access Router AR1 which sets a token with respect to a mobile node, while the mobile node's identity is registered in the cache of the first Access Router AR1. According to the present invention, the identity used to identify the mobile node has only to be verifiable. However, a preferred embodiment would be the user's Network Access Identifier (NAI). When a handover takes place regarding the mobile node from the Access Router AR1 to a second Access Router AR2, the mobile node forwards the token to the Access Router 2 along with its identity, e.g. its Network Access Identifier NAI, with the base station's identity (Base station ID) which is the access point in FIG. 4, and with the identity of the first Access Router AR1 (AR1 ID). Thereafter, the token is verified by means of it being sent from the first Access Router AR1 to the second Access Router AR2, and the identities of the mobile node (e.g. NAI) and of the base station are checked. Then, an entry of the mobile node is added in the cache of the second Access Router AR2.

Stated in other words, FIG. 4 shows a system and method of validating information of a mobile node within a candidate access router discovery procedure in a mobile IP environment, comprising: generating a token by a first access router to which the mobile node was previously attached to; sending the token from the first access router to the mobile node within a message comprising a list of candidate access routers; sending the token from the mobile node to a second access router as selected candidate after a handover procedure between the access routers; sending the token within an exchange between the access routers specific to the discovery procedure from the second access router back to the first access router for verification.

FIG. 4 shows also a system and method of reducing denial-of-service attacks by malicious mobile nodes in a mobile IP environment, comprising: maintaining, by each of a plurality of access routers within the mobile IP environment, a cache of neighboring access routers as candidates and their associated access points; and populating the caches in response to actions initiated by mobile nodes, wherein each cache entry is tagged with the identity of the action initiating mobile node, which identity is based on information that is verifiable by the access routers and which cannot be modified arbitrarily by the mobile node, and the total number of entries that can be tagged and thus introduced into a cache by any given node is limited.

A modification of the aforesaid and another preferred embodiment would be that the mobile node sends the token to the first access router and the first access router verifies the token and sends an OK message to the second access router verifying the fact that the mobile node was attached to the first access router in the immediate past.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. Any of the method steps described herein can be implemented in computer software and stored on computer-readable medium for execution in a general-purpose or special-purpose computer.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
   authenticating a mobile node by an access router;
   authorizing the mobile node to participate in a candidate access router discovery procedure;
   maintaining, by the access router within a mobile internet protocol environment, a cache of neighboring access routers as handover candidates, capabilities of the neighboring access routers, and associated access points of the neighboring access routers, wherein access routers are considered neighbors only if the access routers comprise access points with overlapping coverage areas; and populating the cache with a cache entry in response to a handover action of the mobile node, wherein the cache entry concerns a neighboring access router, the capabilities of the neighboring access router, and an associated access point from which the mobile node is handed over, wherein the cache entry is tagged with authentication information of the mobile node, and wherein a total number of cache entries that can be tagged and thus introduced into the cache by the mobile node is limited.

2. The method according to claim 1, wherein the mobile node is authenticated by using at least one of an international mobile subscriber identity for cellular communication systems and a network access identifier for systems based on internet protocol.

3. The method according to claim 1, further comprising:

receiving a token within a message specific to the candidate access router discovery procedure from the mobile node by the access router as a selected handover candidate after a handover procedure of the mobile node between a previous access router and the access router, wherein the token is generated by the previous access router and is sent from the previous access router to the mobile node within a message comprising a list of candidate access routers; and sending the token within a neighbor exchange between the access routers from the access router back to the previous access router for verification, wherein the access routers are configured to one of create and refresh cache entries concerning the respective other access router, the capabilities of the respective other access router, and the associated access point of the respective other access router.

4. The method according to claim 3, wherein the token is generated by maintaining by the previous access router a short list of random values used as keys to hash the identity of the mobile node, wherein each key in the short list is associated with an integer index that is passed along with the token, and wherein upon receiving the token for verification, the previous access router uses the integer index to lookup the associated key, hash the identity of the mobile node sent in the neighbor exchange, and compare the hash to the token.

5. The method according to claim 4, wherein with progressing time new keys are generated and added to the head of the list while old keys are expired and removed so that from the length of the list and the frequency of the generated new keys, the total amount of time the mobile node has been attached is determined.

6. A system, comprising:

a plurality of access routers within a mobile internet protocol environment, each of the access routers configured to authenticate a mobile node, to authorize the mobile node to participate in a candidate access router discovery procedure, and to maintain a cache of neighboring access routers as handover candidates, capabilities of the neighboring access routers, and associated access points of the neighboring access routers, wherein the access routers are considered neighbors only if the access routers comprise access points with overlapping coverage areas; and a plurality of mobile nodes, each of the mobile nodes configured to perform a handover action between the access routers, wherein the cache is configured to be populated with a cache entry in response to the handover action of the mobile node, wherein the cache entry concerns a neighboring access router, the capabilities of the neighboring access router, and an associated access point from which the mobile node is handed over, and wherein the cache is further configured to tag the cache entry with authentication information of the handover action performing mobile node, and to limit a total number of entries that can be tagged and thus introduced into the cache by any given mobile node.

7. An apparatus, comprising:

a first controller configured to authenticate a mobile node;

a second controller configured to authorize the mobile node to participate in a candidate access router discovery procedure; and a cache of neighboring access routers as handover candidates, capabilities of the neighboring access routers, and associated access points of the neighboring access routers, wherein access routers are considered neighbors only if the access routers comprise access points with overlapping coverage areas;

wherein the cache is configured to be populated with a cache entry in response to a handover action of the mobile node, wherein the cache entry concerns a neighboring access router, the capabilities of the neighboring access router, and an associated access point from which the mobile node is handed over, and wherein the cache is further configured to tag the cache entry with authentication information of the handover action performing mobile node, and to limit a total number of entries that can be tagged and thus introduced into the cache by any given mobile node.

8. The apparatus according to claim 7, further comprising:

a receiver configured to receive a token within a message specific to the candidate access router discovery procedure from the mobile node after a handover procedure of the mobile node between a previous access router and the access router, wherein the previous access router is configured to generate the token and to send the token to the mobile node within a message comprising a list of candidate access routers; and a transmitter configured to send the token within a neighbor exchange with the previous access router for verification, wherein a cache entry concerning the previous access router, the capabilities of the previous access router, and the associated access point of the previous access router is one of created and refreshed, and wherein the previous access router comprises a verifier configured to verify the token.

9. The apparatus according to claim 8, wherein the previous access router comprises a first hashing unit configured to hash the identity of the mobile node by using random values out of a short list as keys, and an associating unit configured to associate each key in the list with an integer index, and wherein the verifier comprises a lookup table for integer indices and the associated keys, a second hashing unit configured to hash the identity of the mobile node and a comparing unit configured to compare the hash to the token.

10. The apparatus according to claim 9, wherein the previous access router is configured to generate new keys with progressing time, to add the new keys to the head of the list, and to remove old keys.

11. The apparatus according to claim 10, wherein the previous access router comprises a determiner configured to determine a total amount of time the mobile node has been attached from the length of the list and the frequency of the generated new keys.

12. A computer program, embodied on a computer readable medium, for controlling a processor to implement a method, the method comprising:
    authenticating a mobile node by an access router;
    authorizing the mobile node to participate in a candidate access router discover procedure;
    maintaining, by the access router within a mobile internet protocol environment, a cache of neighboring access routers as handover candidates, capabilities of the neighboring access routers, and associated access points of the neighboring access routers, wherein access routers are considered neighbors only if the access routers comprise access points with overlapping coverage areas; and
    populating the cache with a cache entry in response to a handover action of the mobile node, wherein the cache entry concerns a neighboring access router, the capabilities of the neighboring access router, and an associated access point from which the mobile node is handed over, wherein the cache entry is tagged with authentication information of the mobile node, and wherein a total number of cache entries that can be tagged and thus introduced into the cache by the mobile node is limited.

13. An apparatus, comprising:
    authentication means for authenticating a mobile node;
    authorization means for authorizing the mobile node to participate in a candidate access router discovery procedure; and
    caching means for storing neighboring access routers as handover candidates, capabilities of the neighboring access routers, and associated access points of the neighboring access routers, wherein access routers are considered neighbors only if they comprise access points with overlapping coverage areas;
    wherein the caching means is configured to be populated with a caching means entry in response to a handover action of the mobile node, wherein the caching means entry concerns a neighboring access router, the capabilities of the neighboring access router, and an associated access point from which the mobile node is handed over, and wherein the caching means is further configured to tag the caching means entry with authentication information of the handover action performing mobile node, and to limit a total number of entries that can be tagged and thus introduced into the caching means by any given mobile node.

14. The method according to claim 1, further comprising:
    receiving a token within a message specific to the candidate access router discovery procedure from the mobile node by the access router as a selected handover candidate after a handover procedure of the mobile node between a previous access router and the access router, wherein the token is generated by the previous access router and is sent from the previous access router to the mobile node within a message comprising a list of candidate access routers; and
    receiving the token within a neighbor exchange between the access routers from the previous access router to the access router for verification, wherein the access routers are configured to one of create and refresh cache entries concerning the respective other access router, the capabilities of the respective other access router, and the associated access point of the respective other access router.

15. The method according to claim 14,
    wherein the token is generated by maintaining by the previous access router a short list of random values used as keys to hash the identity of the mobile node,
    wherein each key in the short list is associated with an integer index that is passed along with the token, and
    wherein upon receiving the token for verification, the access router uses the integer index to lookup the associated key, hash the identity of the mobile node sent in the neighbor exchange, and compare the hash to the token.

16. The apparatus according to claim 7, further comprising:
    a receiver configured to receive a token within a message specific to the candidate access router discovery procedure from the mobile node after a handover procedure of the mobile node between a previous access router and the access router, wherein the previous access router is configured to generate the token and to send the token to the mobile node within a message comprising a list of candidate access routers,
    wherein the receiver is configured to receive the token within a neighbor exchange with the previous access router for verification, and wherein a cache entry concerning the previous access router, the capabilities of the previous access router, and the associated access point of the previous access router is one of created and refreshed; and
    a verifier configured to verify the token.

17. The apparatus according to claim 16,
    wherein the previous access router comprises a first hashing unit configured to hash the identity of the mobile node by using random values out of a short list as keys, and an associating unit configured to associate each key in the list with an integer index, and
    wherein the verifier comprises a lookup table for integer indices and the associated keys, a second hashing unit configured to hash the identity of the mobile node and a comparing unit configured to compare the hash to the token.

* * * * *

UNITED STATES PATENT AND TRADEMARK OFFICE
CERTIFICATE OF CORRECTION

PATENT NO. : 7,656,840 B2 Page 1 of 1
APPLICATION NO. : 10/785407
DATED : February 2, 2010
INVENTOR(S) : Govindarajan Krishnamurthi et al.

It is certified that error appears in the above-identified patent and that said Letters Patent is hereby corrected as shown below:

On the title page, item (75), should read:

Govindarajan Krishnamurthi

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

PATENT NO.       : 7,656,840 B2                                    Page 1 of 1
APPLICATION NO. : 10/785407
DATED            : February 2, 2010
INVENTOR(S)      : Krishnamurthi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this

Fourth Day of January, 2011

David J. Kappos
*Director of the United States Patent and Trademark Office*